US008115943B2

(12) United States Patent
Ohishi et al.

(10) Patent No.: US 8,115,943 B2
(45) Date of Patent: Feb. 14, 2012

(54) IMAGE FORMING APPARATUS AND PRINT PROCESS METHOD

(75) Inventors: Tsutomu Ohishi, Fukuoka (JP); Yuuko Sugiura, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 1302 days.

(21) Appl. No.: 10/660,538

(22) Filed: Sep. 12, 2003

(65) Prior Publication Data

US 2004/0130747 A1 Jul. 8, 2004

(30) Foreign Application Priority Data

Sep. 13, 2002 (JP) ................................ 2002-269283
Sep. 10, 2003 (JP) ................................ 2003-318479

(51) Int. Cl.
*G06F 3/12* (2006.01)

(52) U.S. Cl. ...................................................... 358/1.15

(58) Field of Classification Search ............ 358/1.1–1.9, 358/1.11–1.18; 709/223
See application file for complete search history.

(56) References Cited

U.S. PATENT DOCUMENTS 5,799,206 A 8/1998 Kitagawa et al.
5,809,363 A 9/1998 Kitamura et al.
6,058,113 A 5/2000 Chang
6,141,111 A * 10/2000 Kato ............................ 358/1.15
6,324,302 B1 11/2001 Sugiura
7,136,179 B2 * 11/2006 Ohara .......................... 358/1.15
2001/0040692 A1 * 11/2001 Matsueda et al. ............ 358/1.14
2002/0032761 A1 * 3/2002 Aoyagi et al. ................ 709/223
2002/0033964 A1 3/2002 Suzuki et al.
2002/0051204 A1 5/2002 Ohara
2002/0101608 A1 8/2002 Whitmarsh
2003/0025936 A1 * 2/2003 Ouchi et al. ................ 358/1.15
2006/0173990 A1 8/2006 Kitada et al.

FOREIGN PATENT DOCUMENTS

EP 1 091 562 A1 4/2001
EP 1 098 243 A2 5/2001
EP 1 107 569 A2 6/2001
JP 6-161677 6/1994
JP 10-187388 7/1998
JP 2000-132354 5/2000
JP 2000-510267 8/2000
JP 2001-209503 8/2001
JP 2001209503 A * 8/2001
JP 2002-007090 1/2002
JP 2002-082806 3/2002
JP 2002-86847 3/2002
WO WO97/43720 11/1997
WO WO 01/09743 A1 2/2001

OTHER PUBLICATIONS

U.S. Appl. No. 10/900,098, filed Jul. 28, 2004, Ohishi et al.
U.S. Appl. No. 10/915,333, filed Aug. 11, 2004, Shimizu et al.
U.S. Appl. No. 11/248,288, filed Oct. 13, 2005, Ohishi.
U.S. Appl. No. 11/495,569, filed Jul. 31, 2006, Ohishi.
Office Action issued Nov. 9, 2010, in Japanese Patent Application No. 2008-318869.

* cited by examiner

*Primary Examiner* — Twyler Haskins
*Assistant Examiner* — Lennin Rodriguez
(74) *Attorney, Agent, or Firm* — Oblon, Spivak, McClelland, Maier & Neustadt, L.L.P.

(57) ABSTRACT

An image forming apparatus is provided, in which the image forming apparatus includes: an information providing part for providing, to a client terminal, screen data for selecting one or more image forming apparatuses among from a plurality of image forming apparatuses connected to a network; and a print request part for distributing print data and a print request to the selected one or more image forming apparatuses.

24 Claims, 16 Drawing Sheets

100 COMPOUND MACHINE
110 SOFTWARE GROUP
PRINTER APPLICATION
PDL
PCL
PS
111
COPY APPLICATION
112
FAX APPLICATION
113
SCANNER APPLICATION
114
NET FILE APPLICATION
115
PROCESS CHECK APPLICATION
116
DISTRIBUTION APPLICATION
117
VAS
118
API
ECS
124
MCS
125
OCS
126
FCS
127
NCS
128
SCS
122
SRM
123
GENERAL OS
121
ENGINE I/F
B & W LP
101
COLOR LP
102
HDD
103
NETWORK CONTROLLER
104
OTHER HARDWARE RESOURCES
105
APPLICATION 130
PLATFORM 120

FIG.5

PRINTER LIST DATA (EXAMPLE) 311

| PRINTER NAME | IP ADDRESS | LOCATION | FUNCTION |
|---|---|---|---|
| MFP1 | 192.168.10.28 | 5F-501 SOUTH | ALL AVAILABLE |
| PRT1 | 192.168.10.30 | 5F-501 NORTH | STAPLE NOT AVAILABLE |
| PRT2 | 192.168.20.45 | 7F-702 NORTH | DOUBLE SIDED NOT AVAILABLE |
| MFP2 | 192.168.10.25 | 5F-502 SOUTH | DOUBLE SIDED NOT AVAILABLE |
| PRT3 | 192.168.20.35 | 7F-701 NORTH | ALL AVAILABLE |
| MFP0 | 192.168.10.1 | 5F-502 NORTH | ALL AVAILABLE |
| | ⋮ | | |

FIG.6

MULTIPLE PRINT SETTING DATA (EXAMPLE) 312

| PRINTER NAME | IP ADDRESS | LOCATION | FUNCTION |
|---|---|---|---|
| MFP1 | 192.168.10.28 | 5F-501 SOUTH | ALL AVAILABLE |
| PRT1 | 192.168.10.30 | 5F-501 NORTH | STAPLE NOT AVAILABLE |
| MFP2 | 192.168.10.25 | 5F-502 SOUTH | DOUBLE SIDED NOT AVAILABLE |

MULTIPLE PRINT INITIAL SETTING

PRINTER LIST (MORE THAN ONE PRINTERS CAN BE SELECTED)

| PRINTER NAME | IP ADDRESS | LOCATION | FUNCTION |
| --- | --- | --- | --- |
| MFP1 | 192.168.10.28 | 5F-501 SOUTH | ALL AVAILABLE |
| PRT1 | 192.168.10.30 | 5F-501 NORTH | STAPLE NOT AVAILABLE |
| PRT2 | 192.168.20.45 | 7F-702 NORTH | DOUBLE SIDED NOT AVAILABLE |
| MFP2 | 192.168.10.25 | 5F-502 SOUTH | DOUBLE SIDED NOT AVAILABLE |
| PRT3 | 192.168.20.35 | 7F-701 NORTH | ALL AVAILABLE |
| MFP0 | 192.168.10.1 | 5F-502 NORTH | ALL AVAILABLE |

OK CANCEL

COMPOUND MACHINE100
117
DISTRIBUTION APPLICATION
301
PRINT REQUEST PART
302
WEB INFORMATION PROVIDING PART
S807
303
SHARED MEMORY
S803
304
httpd
S804
S802
S801
TCP/IP
200
PC
201
MULTIPLE PRINT SCREEN
NETWORK CONTROLLER
104
S806
VAS
118
S805
NCS
128
inetd
305
tcpd
306
ipd
307
rshd
308
103
HDD
FILE FOR PRINT
801
S808
310
FLASH MEMORY
PRINTER LIST DATA
311
MULTIPLE PRINT SETTING DATA
312

PRINTER SELECTION

PRINTER LIST (MORE THAN ONE PRINTERS CAN BE SELECTED)

| PRINTER NAME | IP ADDRESS | LOCATION | FUNCTION |
|---|---|---|---|
| MFP1 | 192.168.10.28 | 5F-501 SOUTH | ALL AVAILABLE |
| PRT1 | 192.168.10.30 | 5F-501 NORTH | STAPLE NOT AVAILABLE |
| PRT2 | 192.168.20.45 | 7F-702 NORTH | DOUBLE SIDED NOT AVAILABLE |
| MFP2 | 192.168.10.25 | 5F-502 SOUTH | DOUBLE SIDED NOT AVAILABLE |
| PRT3 | 192.168.20.35 | 7F-701 NORTH | ALL AVAILABLE |
| MFP0 | 192.168.20.35 | 6F-601 NORTH | ALL AVAILABLE |

OK CANCEL 1600
1617
DISTRIBUTION APPLICATION
1601
IP OBTAINING PART
301
PRINT REQUEST PART
302
WEB INFORMATION PROVIDING PART
303
SHARED MEMORY
VAS
118
NCS
128
httpd
304
snmpd
1602
inetd
305
tcpd
306
ipd
307
rshd
308
HDD
103
NETWORK CONTROLLER
104
220
TCP/IP
ROUTER
210
MIB
1610
FLASH MEMORY
310
PRINTER LIST DATA
311
MULTIPLE PRINT SETTING DATA
312

IMAGE FORMING APPARATUS AND PRINT PROCESS METHOD

BACKGROUND OF THE INVENTION

1. Field of the Invention

The present invention relates to an image forming apparatus for causing one or more image forming apparatuses that are connected to a network to perform user services on image formation.

2. Description of the Related Art

Recently, an image forming apparatus (to be referred to as a compound machine hereinafter) that includes functions of a printer, a copier, a facsimile, a scanner and the like in a cabinet is generally known. The compound machine includes a display part, a printing part and an image pickup part and the like in a cabinet. In the compound machine, three pieces of software corresponding to the printer, copier and facsimile respectively are provided, so that the compound machine functions as the printer, the copier, the scanner and the facsimile respectively by switching the software.

A conventional compound machine or a printer is connected to a network such as the Internet, so that a client terminal such as a PC (Personal computer) on the network sends a document printing request to the printer, and the printer prints the document. For controlling the printer to print the document from the PC, it is necessary to install a printer driver corresponding to the printer in the PC.

Since the conventional compound machine is provided with each software for the printer, the copier, the scanner and the facsimile individually, much time is required for developing the software. Therefore, the applicant has developed an image forming apparatus (compound machine) including hardware resources, a plurality of applications, and a platform including various control services provided between the applications and the hardware resources. The hardware resources include a display part, a printing part and an image pickup part. The applications perform processes intrinsic for user services of printer, copier and facsimile and the like. The platform includes various control services performing management of hardware resources necessary for at least two applications commonly, performing execution control of the applications, and image forming processes, when a user service is executed.

However, in an environment in which such compound machines or printers are connected to the network, it is necessary to install printer driver programs in the client terminal for each compound machine and each printer, and there is a problem in that a client terminal in which a printer driver program is not installed can not use a corresponding printer.

Especially, in an environment in which a plurality of client terminals are connected, it is necessary to install printer driver programs corresponding to necessary printers into each client terminal, so that there is a problem in that enormous efforts should be expended to construct the printer environment.

In addition, when it is necessary to print a number of copies for a file, the client terminal prints necessary number of copies successively by using one printer in general. However, if the number of copies is large, there is a problem in that much time is required to print all of the copies.

SUMMARY OF THE INVENTION

An object of the present invention is to provide an image forming apparatus and a print process method for causing a plurality of printers to print print data without constructing special environment in client terminals.

The above object is achieved by an image forming apparatus including:

an information providing part for providing, to a client terminal, screen data for selecting one or more image forming apparatuses among from a plurality of image forming apparatuses connected to a network; and a print request part for distributing print data and a print request to the selected one or more image forming apparatuses.

According to the present invention, a print file can be printed by a plurality of image forming apparatuses on an network even when the client terminal does not include corresponding printer drivers. Thus, it is not necessary to construct printer environment in the client terminal for printing a print file to a plurality of image forming apparatuses. In addition, in a case when a plurality of numbers of copies need to be made, the copies can be printed quickly by using the plurality of image forming apparatuses.

In the image forming apparatus, the information providing part sends screen data for inputting a print instruction to the client terminal; and the print request part distributes the print data and the print request when receiving the print instruction from the client terminal. Therefore, printing can be instructed from the client terminal.

The information providing part may send screen data used for uploading the print data to the client terminal; and the image forming apparatus receives the print data when the print data is uploaded from the client terminal. The image forming apparatus can store the uploaded data and send the data to a plurality of printers later, or the image forming apparatus can send the data to a plurality of printers soon after it receives the data from the client terminal.

The above-mentioned screen data can be displayed by a Web browser in the client terminal.

In the image forming apparatus, the screen data may include data for displaying a plurality of image forming apparatuses and corresponding places for each of the image forming apparatuses. Accordingly, the user can select image forming apparatuses in consideration of the places of the image forming apparatuses. In addition, the screen data may include data for displaying a plurality of image forming apparatuses and corresponding functions for each of the image forming apparatuses. Accordingly, the user can select image forming apparatuses in consideration of the functions of the image forming apparatuses.

The image forming apparatus may further include a storing part for storing information including addresses of the selected one or more image forming apparatuses, wherein the print request part distributes the print data and the print request by referring to the information stored in the storing part.

In the image forming apparatus, the print instruction may include an instruction for designating functions to be used for printing the print data, and the print request part selects one or more image forming apparatuses that includes the designated functions from among the selected one or more image forming apparatuses, and distributes the print data and the print request to the one or more image forming apparatuses that includes the designated functions.

According to this configuration, the print data can be printed only by image forming apparatuses that include desired functions.

In the image forming apparatus, the print request part requests the printing part of the image forming apparatus itself to print the print data by using a loop back address.

The image forming apparatus may further include an address obtaining part for obtaining addresses of image forming apparatuses connected to a network; and the print request part distributes the print data and the print request by using the addresses obtained by the address obtaining part.

BRIEF DESCRIPTION OF THE DRAWINGS

Other objects, features and advantages of the present invention will become more apparent from the following detailed description when read in conjunction with the accompanying drawings, in which:

FIG. 5 shows an example of the printer list data according to the first embodiment;

FIG. 6 shows an example of the multiple print setting data according to the first embodiment;

FIG. 7 shows an example of the multiple print initial setting screen according to the first embodiment;

FIG. 8A shows an example of the printing screen according to the first embodiment;

FIG. 8B shows an example of the multiple print screen 201 displayed on the Web browser of the PC 200 according to the first embodiment;

FIG. 16 shows an example of the printer selection screen displayed on the Web browser of the PC 200 according to the second embodiment;

DETAILED DESCRIPTION OF THE PREFERRED EMBODIMENTS

In the following, the image forming apparatus and the print process method will be described with reference to figures.

First Embodiment

The image forming apparatus (to be referred to as compound machine hereinafter) 100 of the first embodiment receives a request from a PC 200 that is a client terminal on a network by using a distribution application 117. Then, the compound machine 100 selects a compound machine 140*a* or a printer 140*b*, and sends a document printing request to the compound machine 140*a* or the printer 140*b*, so that the selected compound machine 140*a* or the printer 140*b* prints the document.

Figure 1:
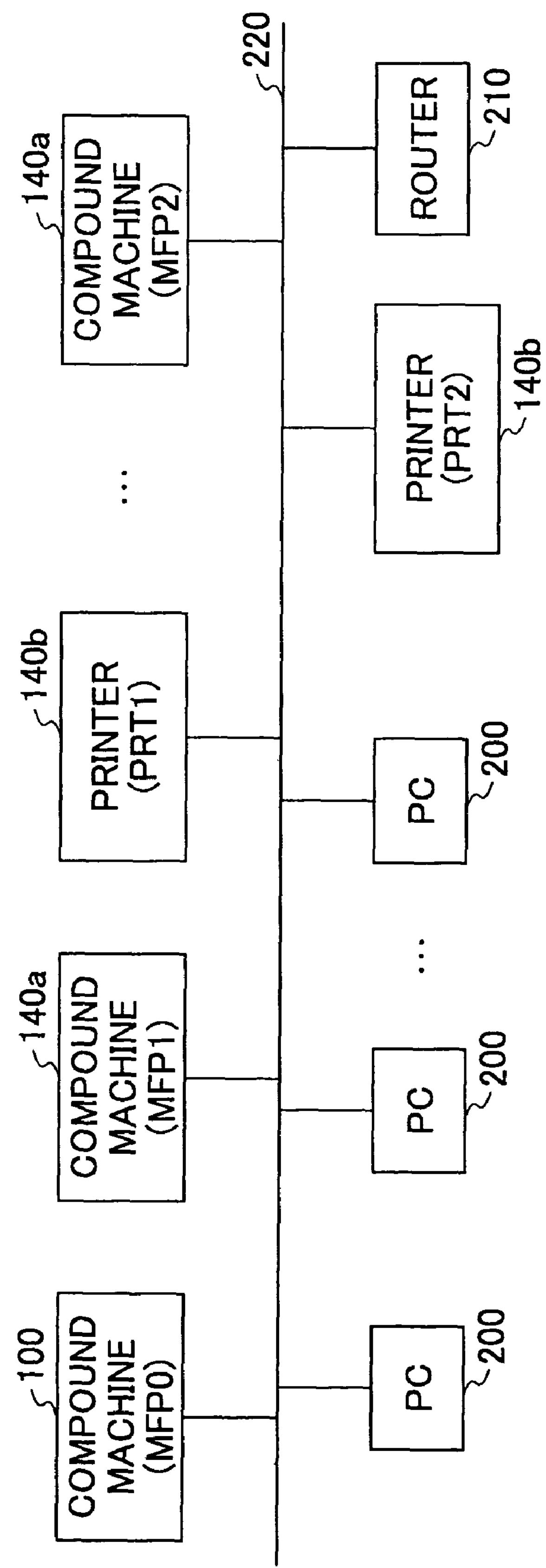
FIG. 1 is a block diagram indicating a network configuration including the compound machine of the first embodiment.

FIG. 1 is a block diagram indicating a network configuration including the compound machine 100 of the first embodiment. As shown in FIG. 1, according to the present embodiment, the network configuration includes a LAN environment in which image forming apparatuses such as a compound machine (MFP0) 100, compound machines (MFP1, MFP2) 140*a* and printers (PRT1, PRT2) 140*b*, and a PC 200 that generates a print file to be printed from the image forming apparatuses are connected by the Ethernet 220. In addition, the Ethernet 220 connects a router 210. TCP/IP is used among for communication in the LAN.

The compound machine (MFP0) 100 receives a printing request from the PC 200, and selects one or more printers that can print the requested print file among from the compound machines and the printers, and sends the print file and a print request message to each of the selected apparatuses.

Figure 2:
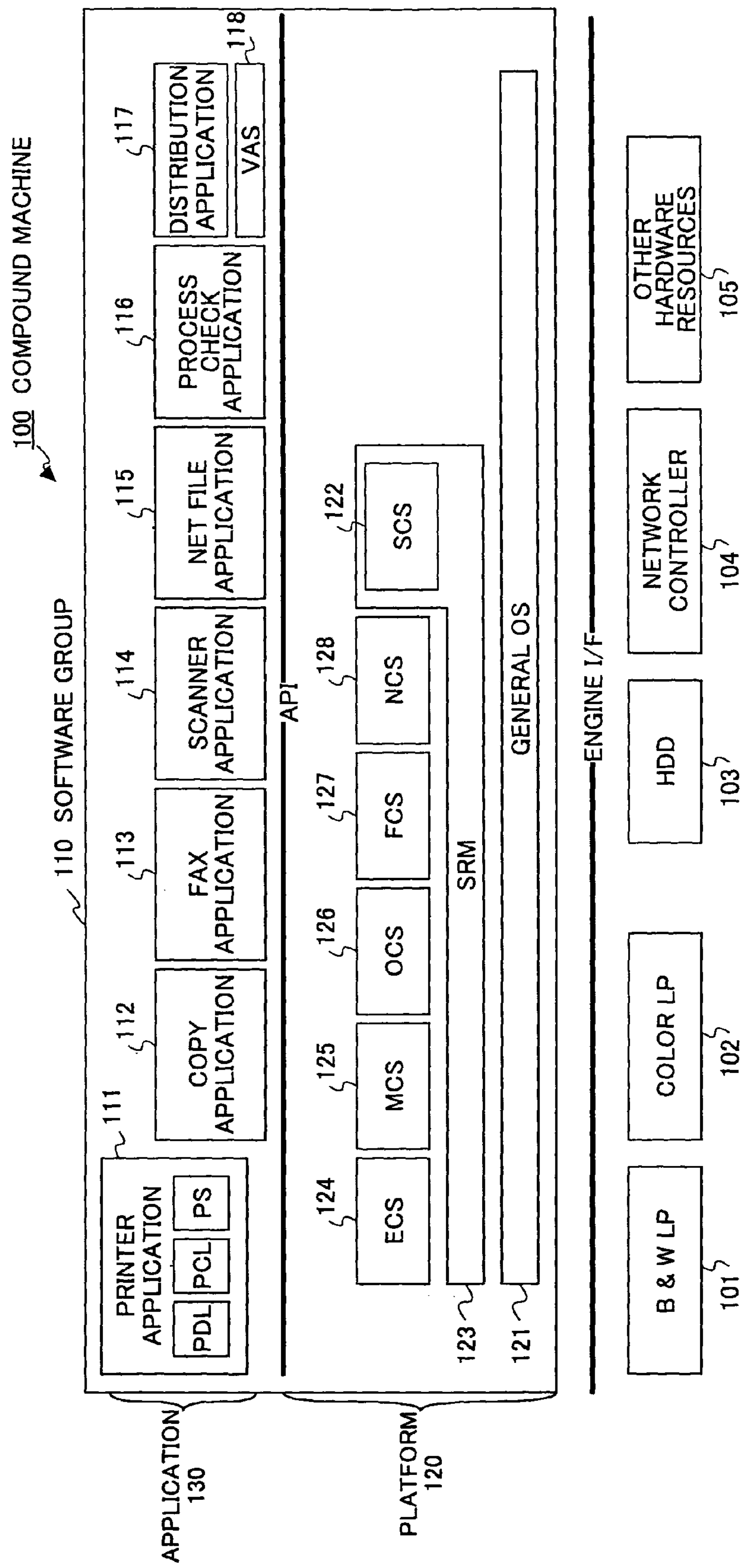
FIG. 2 is a block diagram of the compound machine according to the first embodiment.

Next, the whole functional configuration of the compound machine 100 will be described. FIG. 2 is a block diagram of the compound machine according to the first embodiment of the present invention.

As shown in FIG. 2, the compound machine 100 includes hardware resources and a software group 110. The hardware resources include a black and white line printer (B&W LP) 101, a color laser printer (Color LP) 102, a hard disk 103, a network controller 104, and hardware resources 105 such as a scanner, a facsimile, and a memory. The software group 110 includes a platform 120 and applications 130.

The platform 120 includes control services for interpreting a process request from an application and issuing an acquiring request for hardware resources, a system resource manager (SRM) 123 for managing one or more hardware resources and arbitrating the acquiring requests from the control services, and a general-purpose OS 121.

The control services include a plurality of service modules, which are a system control service (SCS) 122, an engine control service (ECS) 124, a memory control service (MCS) 125, an operation panel control service (OCS) 126, a fax control service (FCS) 127, a network control service (NCS) 128. In addition, the platform 120 has application program interfaces (API) that can receive process requests from the applications 130 by using predetermined functions.

The general purpose OS 121 is a general purpose operating system such as UNIX, and can execute each piece of software of the platform 120 and the applications 130 concurrently as a process.

The process of the SRM 123 is for performing control of the system and for performing management of resources with the SCS 122. The process of the SRM 123 performs arbitration and execution control for requests from the upper layer that uses hardware resources including engines such as the scanner part and the printer part, a memory, a HDD file, a host I/Os (Centronics I/F, network I/F IEEE1394 I/F, RS232C I/F and the like).

More specifically, the SRM 123 determines whether the requested hardware resource is available (whether it is not used by another request), and, when the requested hardware resource is available, notifies the upper layer that the requested hardware resource is available. In addition, the SRM 123 performs scheduling for using hardware resources for the requests from the upper layer, and directly performs processes corresponding to the requests (for example, paper transfer and image forming by a printer engine, allocating memory area, file generation and the like).

The process of the SCS 122 performs application management, control of the operation part, display of system screen, LED display, resource management, and interrupt application control.

The process of the ECS 124 controls engines of hardware resources including the white and black laser printer (B&W LP) 101, the color laser printer (Color LP) 102, the scanner, and the facsimile and the like. The process of the MCS 125 obtains and releases an area of the image memory, uses the hard disk apparatus (HDD), and compresses and expands image data.

The process of the FCS 127 provides APIs for sending and receiving of facsimile from each application layer by using PSTN/ISDN network, registering/referring of various kinds of facsimile data managed by BKM (backup SRAM), facsimile reading, facsimile receiving and printing, and mixed sending and receiving.

The NCS 128 is a process for providing services commonly used for applications that need network I/O. The NCS 128 distributes data received from the network by a protocol to a corresponding application, and acts as mediation between the application and the network when sending data to the network. More specifically, the process of the NCS 128 includes server daemon such as ftpd, httpd, lpd, snmpd, telnetd, smtpd, and client function of the protocols.

The process of the OCS 126 controls an operation panel that is a means for transferring information between the operator (user) and control parts of the machine. In the compound machine 100 of this embodiment, the OCS 126 includes an OCS process part and an OCS function library part. The OCS process part obtains a key event, which indicates that the key is pushed, from the operation panel, and sends a key event function corresponding to the key event to the SCS 122. The OCS function library registers drawing functions and other functions for controlling the operation panel, in which the drawing functions are used for outputting various images on the operation panel on the basis of a request from an application or from the control service. The OCS function library is dynamically linked to the application and each module of the control services. All of the OCS 126 can be configured as a process, or can be configured as an OCS library.

The application 130 includes a printer application 111 that is an application for a printer having page description language (PDL) and PCL and post script (PS), a copy application 112, a fax application 113, a scanner application 114, a network file application 115, a process check application 116 and the distribution application 117 for distributing a print request message. In addition, a virtual application service (VAS) 118 is included.

Interprocess communication is performed between a process of the application 130 and a process of the control service, in which a function is called, a returned value is sent, and a message is sent and received. By using the interprocess communication, user services for image forming processes such as copying, printing, scanning, and sending facsimile are realized.

As mentioned above, the compound machine 100 of the first embodiment includes a plurality of applications 130 and a plurality of control services, and each of those operates as a process. In each process, one or more threads are generated and the threads are executed in parallel. The control services provide common services to the applications 130. User services on image formation such as copying, printing, scanning and sending facsimile are provided while the processes are executed in parallel, the threads are executed in parallel, and interprocess communication is performed. A third party vendor can develop applications for the compound machine 100, and can execute the application in an application layer on the control service layer in the compound machine 100.

In the compound machine 100 of the first embodiment, although processes of applications 130 and processes of control services operate, the application and the control service can be a single process. In addition, an application in the applications 130 can be added or deleted one by one.

Figure 3:
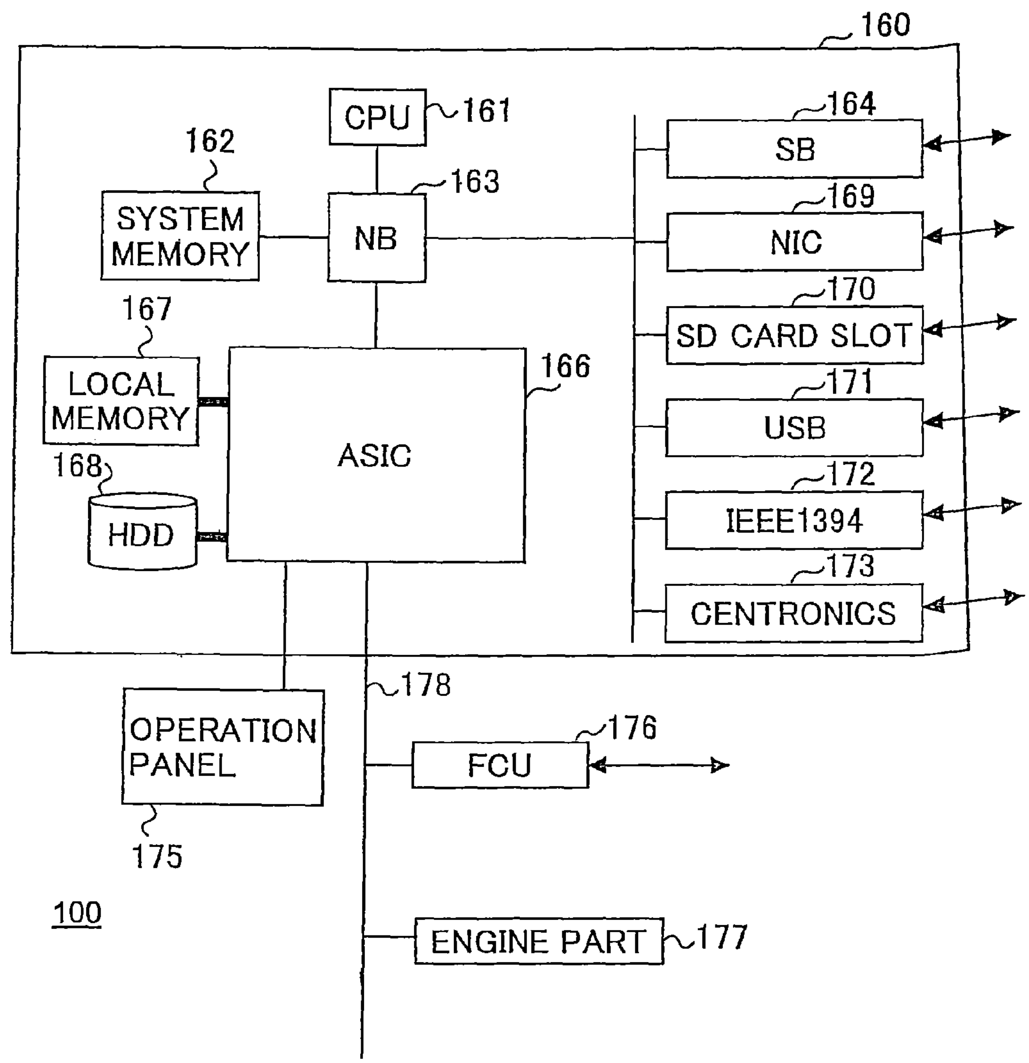
FIG. 3 shows an example of a hardware configuration of the compound machine according to the first embodiment.

FIG. 3 shows an example of a hardware configuration of the compound machine 100.

The compound machine 100 includes a controller 160, an operation panel 175, a fax control unit (FCU) 176, and an engine part 177 that is hardware resource such as a printer that is specific for image forming processing. The controller 160 includes CPU 161, a system memory 162, a north bridge (NB) 163, a south bridge (SB) 164, ASIC 166, a local memory 167, HDD 168, a network interface card (NIC) 169, a SD card slot 170, a USB device 171, an IEEE1394 device 172, and a Centronics 173. The memories 162, 167 may include RAMs and/or ROMs, for example. The FCU 176 and the engine part 177 are connected to the ASIC 166 in the controller via a PCI bus 178. The CPU 161 executes programs of the applications and control services and the like installed in the compound machine 100 by reading data from a RAM.

The configuration of the compound machine **140*a* shown in FIG. 1 is almost the same as that of the compound machine 100 shown in FIG. 2, in which the compound machine 140*a* does not include the distribution application 117**.

Figure 4:
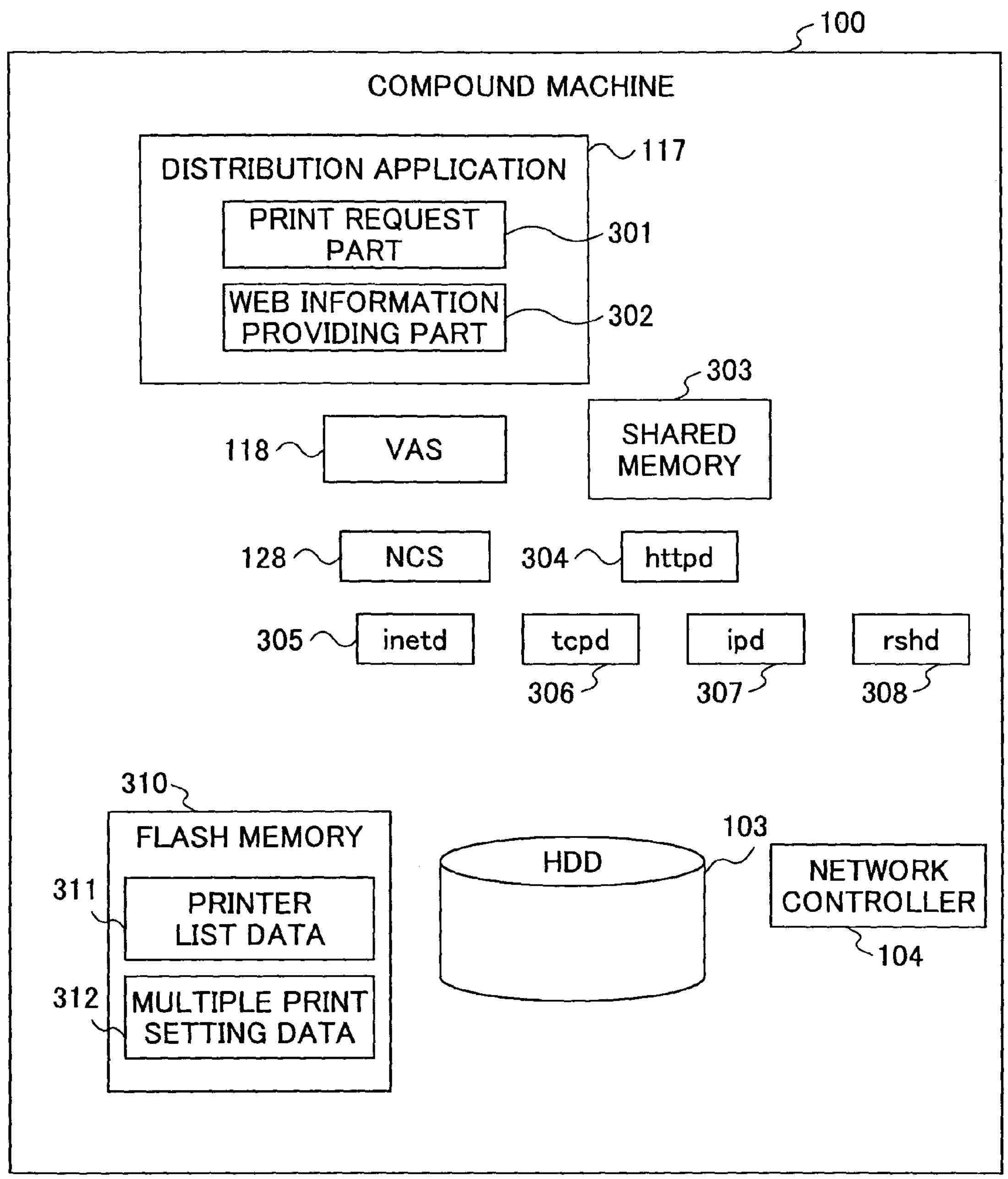
FIG. 4 shows the configuration of the distribution application 117 in the compound machine 100 and a main configuration of the compound machine 100 for performing multiple printing process.

Next, the distribution application 117 will be described in detail. FIG. 4 shows the configuration of the distribution application 117 in the compound machine 100 and a main configuration of the compound machine 100 for performing multiple printing process.

The compound machine 100 mainly includes, for performing the multiple printing process, as shown in FIG. 4, the distribution application 117, the VAS (virtual application service) 118, the NCS 128, daemons of a general OS such as inetd 305, tcpd 306, ipd 307, rshd 308 and httpd 304, a shared memory 303, a flash memory 310, a HDD (hard disk drive) 103 and a network controller 104.

The distribution application 117 includes a print request part 301 and a Web information providing part 302. The Web information providing part 302 operates as a Web server (http server) for the PC 200, and displays a multiple print screen 201 (FIG. 8B) and a multiple print initial setting screen 202 (FIG. 7) on a Web browser running on the PC 200. Display of each screen on the Web browser, and receiving of various requests and various settings are performed by the http protocol by using the httpd 304. Each of the multiple print screen 201 and the multiple print initial setting screen 202 is a file based on html (Hyper Text Markup Language) format.

The Web information providing part 302 in the distribution application 117 performs processing according to an input from the multiple print screen 201 or the multiple print initial setting screen 202 by using a CGI script, and sends the execution result to the PC so that the result is reflected to the multiple print screen 201 or the multiple print initial setting screen 202.

More specifically, when the Web information providing part 302 receives an upload request of a print file from the multiple print screen 201, the uploaded print file is stored in the HDD 103. In addition, the Web information providing part 302 displays the process result on the multiple print screen 201 by executing the CGI script. In addition, when the Web information providing part 302 receives a print request from the multiple print screen 201, the Web information providing part 302 notifies the print request part 301 that it receives the request. This process is also executed by executing a CGI script.

In addition, when the Web information providing part 302 receives setting information from the multiple print initial setting screen 202 displayed on the Web browser on the PC 200, the Web information providing part 302 stores the setting information in the flash memory 310 by executing a CGI script.

Although the Web information providing part 302 performs various processes by executing CGI programs as mentioned above, the processes can be also executed by other programs that are called by the CGI programs. In addition, the multiple print screen 201 and the multiple print initial setting screen 202 can be made by the XML (extensible markup language) format.

When the print request part 301 receives a notification of receiving a print request from the Web information providing part 302, the print request part 301 selects one or more apparatuses that can perform printing among from the compound machines 140*a* and the printers 140*b*, and requests for the apparatuses to print the print file by specifying IP addresses of the selected apparatuses. At this time, the uploaded print file is also sent to each of the selected apparatuses. For selection of the apparatuses by the print request part 301, apparatuses set in multiple print setting data 312 stored in the flash memory 310 are selected.

The print request to the selected apparatuses are performed by performing remote print function call by specifying the IP addresses. The remote print function is for sending a print request message to printer applications of the compound machines and the printers corresponding to the specified IP addresses according to rsh (remote shell) protocol of UNIX. The remote print function is registered in the remote function library. The remote function library is linked with the distribution application 117.

The rsh protocol is a capability realized in UNIX. The rsh protocol is a protocol for executing commands on other hosts on the network. In this embodiment, the hosts are the compound machines and printers on the network.

The distribution application can be installed to the compound machine from a recording medium such as a SD card. In addition, the distribution application can be downloaded via network and can be installed in the compound machine.

The VAS 118 is placed between the control service and the application. The VAS 118 mediates accesses between the application and the control service. In addition, the VAS 118 notifies the Web information providing part 302 that the NCS 128 receives a request message. The NCS 128 controls the network, and notifies the VAS 118 that the NCS 128 receives the request message from the httpd 304.

The httpd 304 always monitors the port 80 that receives a message sent by the http protocol. The httpd 304 receives the request message by using the port 80, and sends a response message. The structure of the request message and the response message is the same as the structure of a normal http protocol, in which each message includes a message body of html format. The httpd 304 notifies the NCS 128 that the httpd 304 receives a request message via the Ethernet 220, and stores the request message in the shared memory 303.

The inetd 305 is a daemon that receives each remote print function call. In addition, the inetd 305 always monitors arrival of various protocols (including rsh protocol) on the network. When the inetd 305 detects a connection request for a specific protocol, the inetd 305 launches a server program for processing the protocol. Capabilities of the inetd 305 are the same as the inetd of UNIX. Since the compound machine 100 of the first embodiment monitors arrival of data by using the rsh protocol, the rsh port is always monitored. When a connection request is detected on the rsh port, rshd 308 is launched.

The tcpd 306 is a daemon for performing communication process according to a procedure of TCP layer of TCP/IP protocol. The ipd 307 is a daemon for performing communication process according to a procedure of IP layer of TCP/IP protocol. The rshd 308 is a daemon for performing communication process by using a procedure of rsh protocol. The rshd 308 is launched by the inetd 305 when the compound machine receives a control command from the network. The rshd 308 sends the received control command and data to the process of the NCS 128.

The network controller 104 performs preparation of communication by the rsh protocol and SNMP protocol. In addition, the network controller 104 receives and sends commands, data and status by the rsh protocol.

The printer list data 311 stored in the flash memory 310 indicate compound machines 140*a* and printers 140*b* that can perform printing on the network. The printer list data 311 is prepared by a system manager or a network manager beforehand. For preparing the list, the system manager or the network manager grasps printer names, IP addresses, installed locations and print capabilities for the compound machines (including the compound machine 100) and the printers connected to the Ethernet.

FIG. 5 shows an example of the printer list data 311. As shown in FIG. 5, the printer list data 311 includes printer names, IP addresses, installed locations, and printing capabilities.

The multiple print setting data 312 stored in the flash memory 310 is data extracted from the printer list data 311, and includes data for compound machines 140*a* and printers 140*b* to be used for printing. FIG. 6 shows an example of the multiple print setting data 312. As shown in FIG. 6, the multiple print setting data 312 includes, for each apparatus, printer name, IP address, installed location, and printing capability, in which these are associated with each other. The print request part 301 in the distribution application 117 refers to the multiple print setting data 312, and performs remote print function call by designating each IP address of the compound machines and the printers registered in the multiple print setting data 312 to send the print request message.

The multiple print setting data 312 can be set from the multiple print initial setting screen 202 displayed on the Web browser of the PC 200 by the Web information providing part 302. FIG. 7 shows an example of the multiple print initial setting screen 202. A system manager or other user displays the multiple print initial setting screen 202 on the Web browser of the PC 200, and sets the compound machines and the printers to be used for printing. As shown in FIG. 7, the printer list box on the multiple print initial setting screen 202 shows printer name, IP address, installed location and capability for each of the compound machines and the printers registered in the printer list data 311. When one or more apparatuses to be used for printing are selected, the Web information providing part 302 generates, in the flash memory 310, the multiple print setting data 312 in which the selected apparatuses are set.

Next, the multiple print process method by using the distribution application 117 of the compound machine 100 will be described. First, the user designates a print command in an application for printing a file on the PC 200, so that a printing screen is displayed.

Figures 8A, 8B:
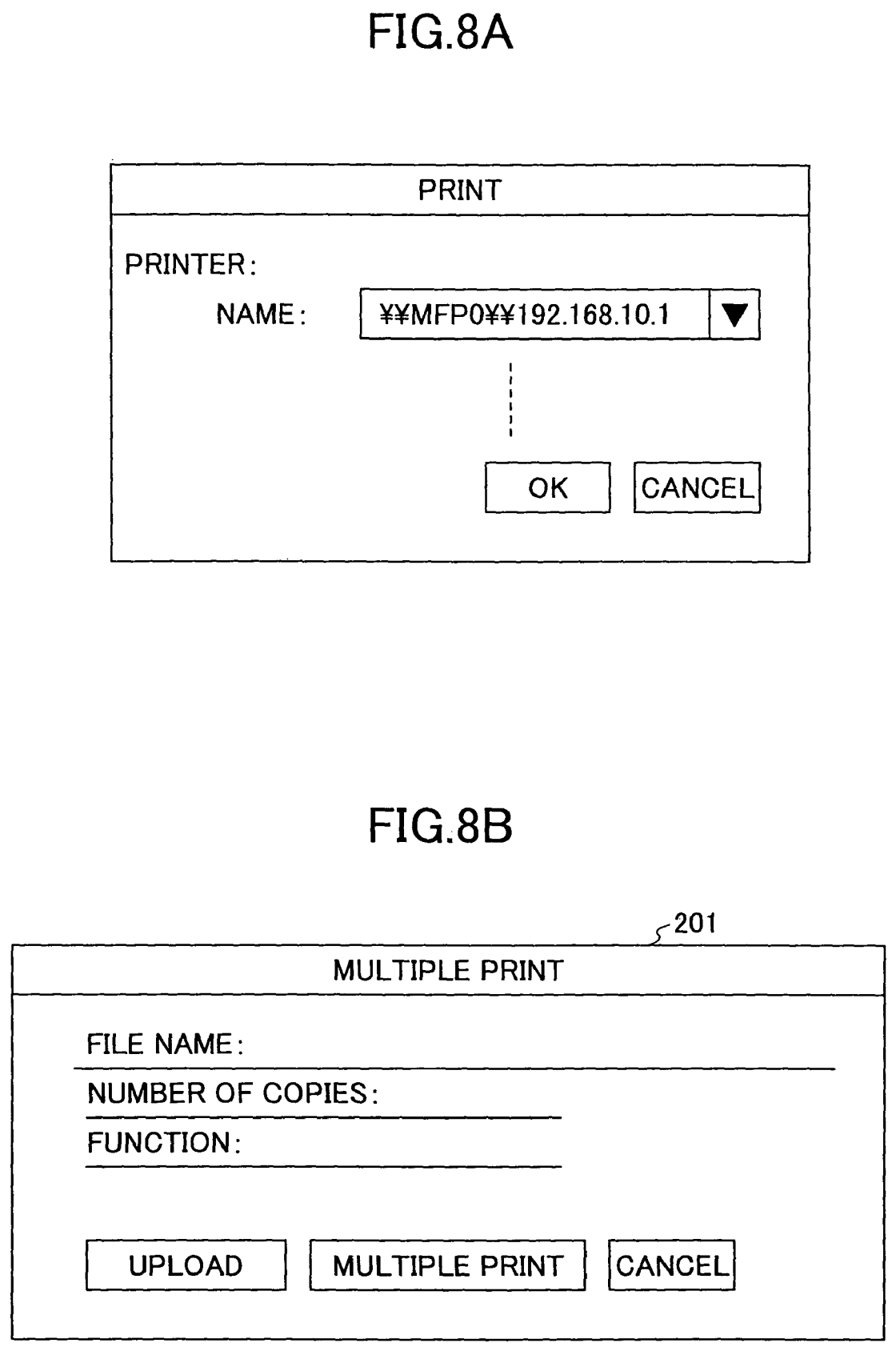

FIG. 8A shows an example of the printing screen. For performing multiple print according to the present invention, the user of the PC 200 specifies, in the printer name field in the printing screen, a printer name including the URL of the compound machine (MFP0) 100. In the FIG. 8A, although the printer name is "¥¥MFP0¥¥192.168.10.1", description of the printer name is not limited to this.

As shown in FIG. 8A, when the user specifies the printer name of the compound machine (MFP0) on the printing screen and clicks OK button, the application in the PC 200 accesses the compound machine (MFP0) 100. In the compound machine 100, the Web information providing part 302 of the distribution application 117 causes the PC 200 to display the multiple print screen 201 on the Web browser according to the http protocol.

Instead of using the above-mentioned application to obtain the multiple print screen, the user can access the compound machine 100 by using the Web browser by specifying the address of the compound machine 100.

FIG. 8B shows an example of the multiple print screen 201 displayed on the Web browser of the PC 200. The source file of the multiple print screen 201 is a html file. As shown in FIG. 8*b*, the multiple print screen 201 shows a file name field, a copy number field, and a function field. The file name field is for specifying a file name to be printed. The copy number field is for specifying the number of copies to be printed. The function field is for specifying functions (such as staple, double-sided printing, and the like) used for printing. In addition, the multiple print screen 201 shows an upload button, a multiple print button and a cancel button. The upload button is for sending the print file specified in the file name field to the compound machine 100. The multiple print button is for instructing the compound machine 100 to execute multiple print process for the print file. The cancel button is for cancelling multiple print process.

Figure 9:
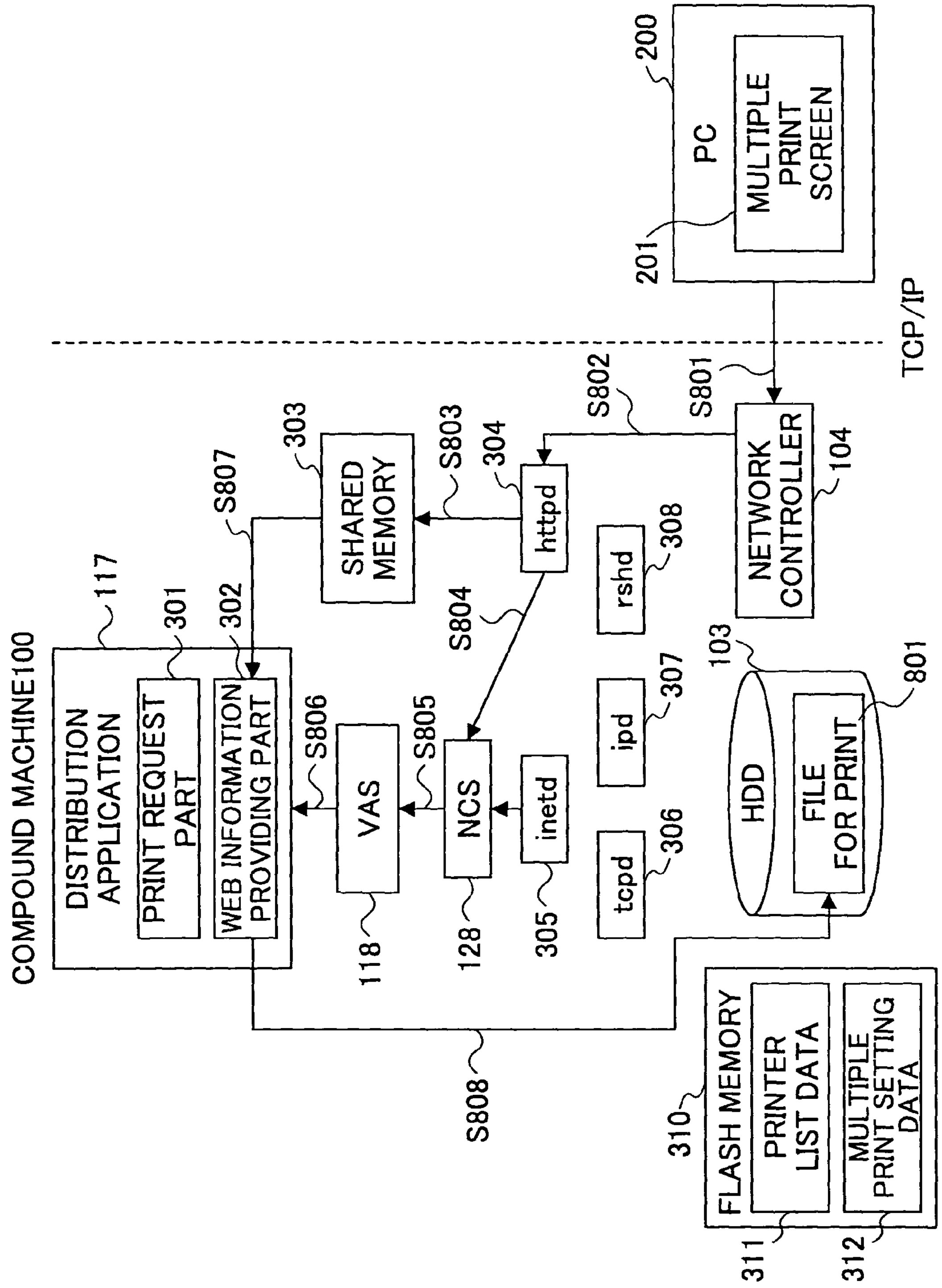
FIG. 9 is a figure for explaining data flow in the compound machine at the time of upload request and print request according to the first embodiment.

FIG. 9 is a figure for explaining data flow in the compound machine 100 at the time of upload request and print request. The user of the PC 200 specifies the print file to be printed in the file name field, specifies the number of copies in the copy number field, and specifies print functions in the function field. Then, when the user clicks the upload button, the settings and a request message of upload are sent to the distribution application 117 of the compound machine 100.

Figure 10:
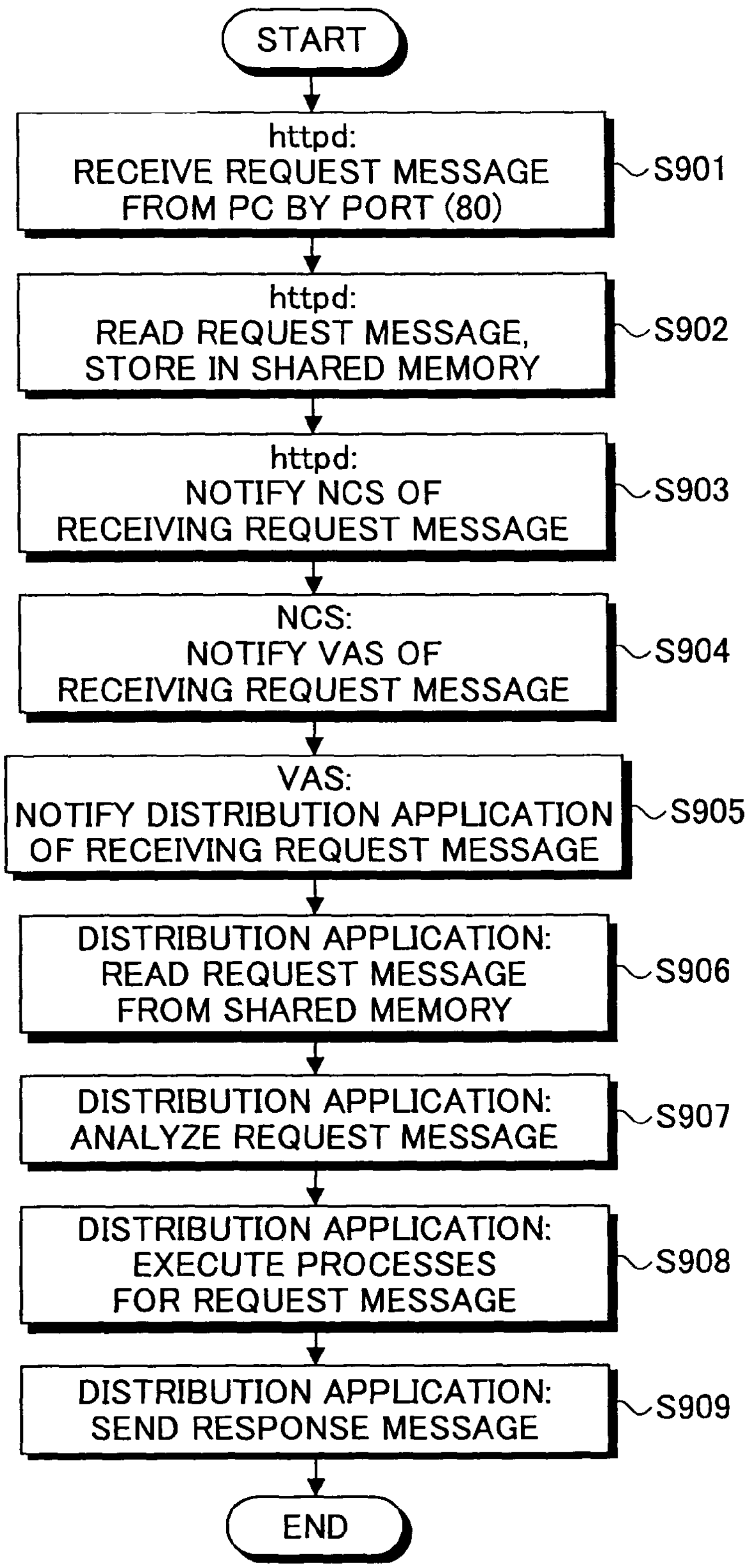
FIG. 10 shows a flowchart of processes performed in the compound machine that receives a request message according to the first embodiment.

In the following, processes performed in the compound machine 100 that receives the request message will be described. FIG. 10 shows a flowchart in the compound machine.

The httpd 304 always monitors port 80, and receives the request message from the PC 200 by using the port 80 in step S901. Then, the httpd 304 reads the received request message and writes the request message in the shared memory 303 in step S902. Next, the httpd 304 notifies the NCS 128 that the httpd 304 received the request message in step S903.

The NCS 128 that receives the notification further notifies the VAS 118 of receiving the request message in step S904. The VAS 118 notifies the distribution application 117 of receiving the request message in step S905. The notification triggers the web information providing part 302 in the distribution application 117 to read the request message by referring to the shared memory 303 in step S906. Then, the web information providing part 302 analyzes the content of the request message in step S907, and executes processes according to instructions included in the message body of the request message in step S908. If instruction for executing CGI program is included in the message body, the corresponding CGI program is executed.

Then, the distribution application 117 returns the result of the process to the PC 200 as a response message via the httpd 304 in step S909.

In this embodiment, the NCS 128 that received the notification of receiving the request message notifies the VAS 118 of receiving the request message, and the VAS 118 notifies the distribution application 117 of receiving the request message. However, the NCS 128 may directly notifies the distribution application 117 of receiving the request message.

Therefore, when the upload button is clicked on the multiple print screen of the PC 200, a request message including an upload request and a specified file name is sent to the compound machine 100 from the PC 200 in step S801. In the compound machine 100, the httpd 304 receives the request message via the network controller 104 in step S802. Then, the httpd 304 stores the received request message in the shared memory in step S803, and notifies the NCS 128 of receiving the request message in step S804. As mentioned above, the notification is sent to the distribution application via the VAS 118 in steps S805 and S806. When the distribution application 117 receives the notification of receipt of the request message, the web information providing part 302 reads the request message from the shared memory 303 in step S807. Then, the web information providing part 302 analyzes the message. Then, the web information providing part 302 determines that the message indicates the upload request, and receives the print file 801 specified by the request message from the PC 200, and stores it in the HDD 103 in step S808.

Figure 11:
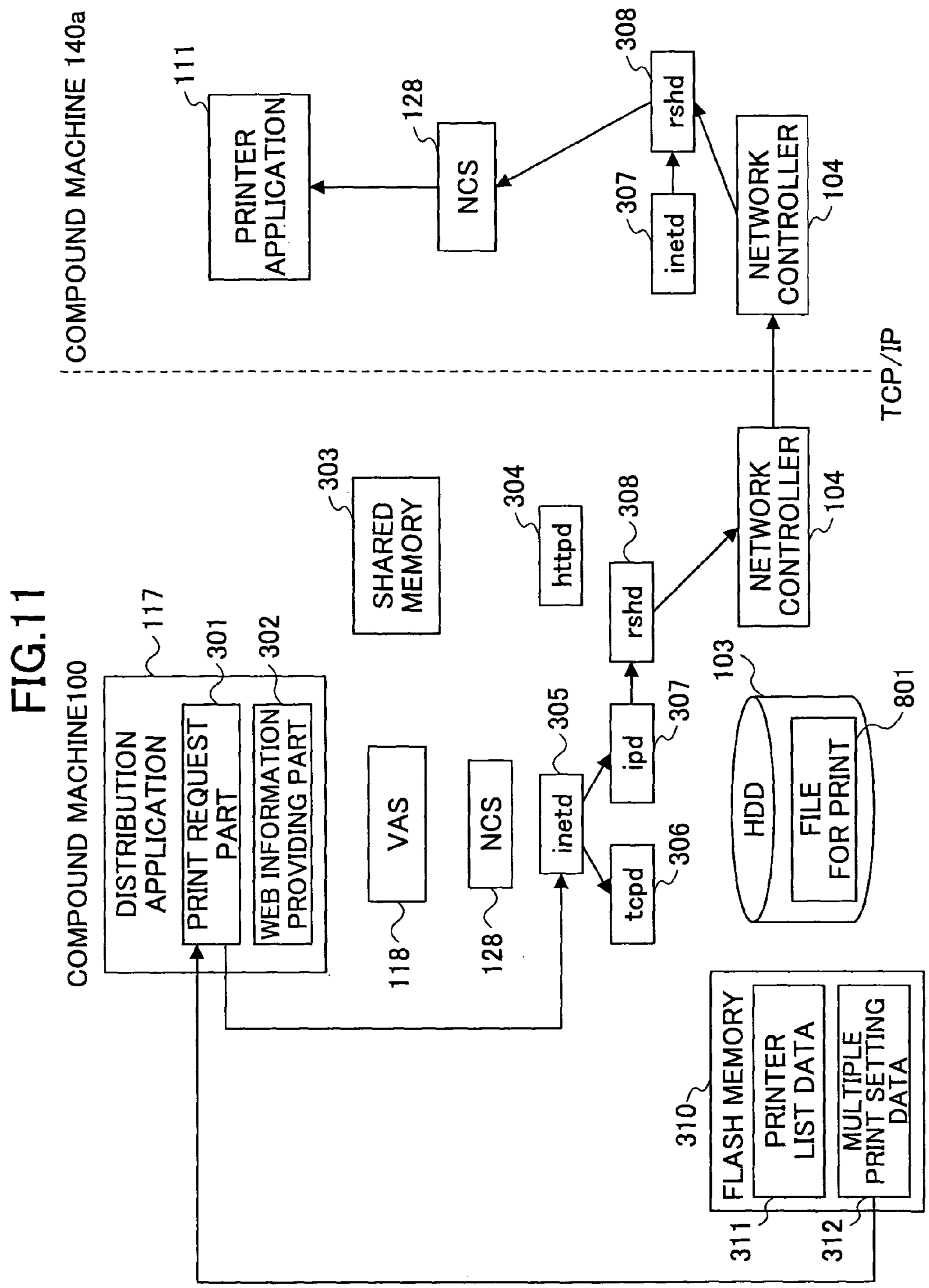
FIG. 11 shows data flows for selecting compound machines and printers to be used for printing, and process for distributing the print request.
Figure 12:
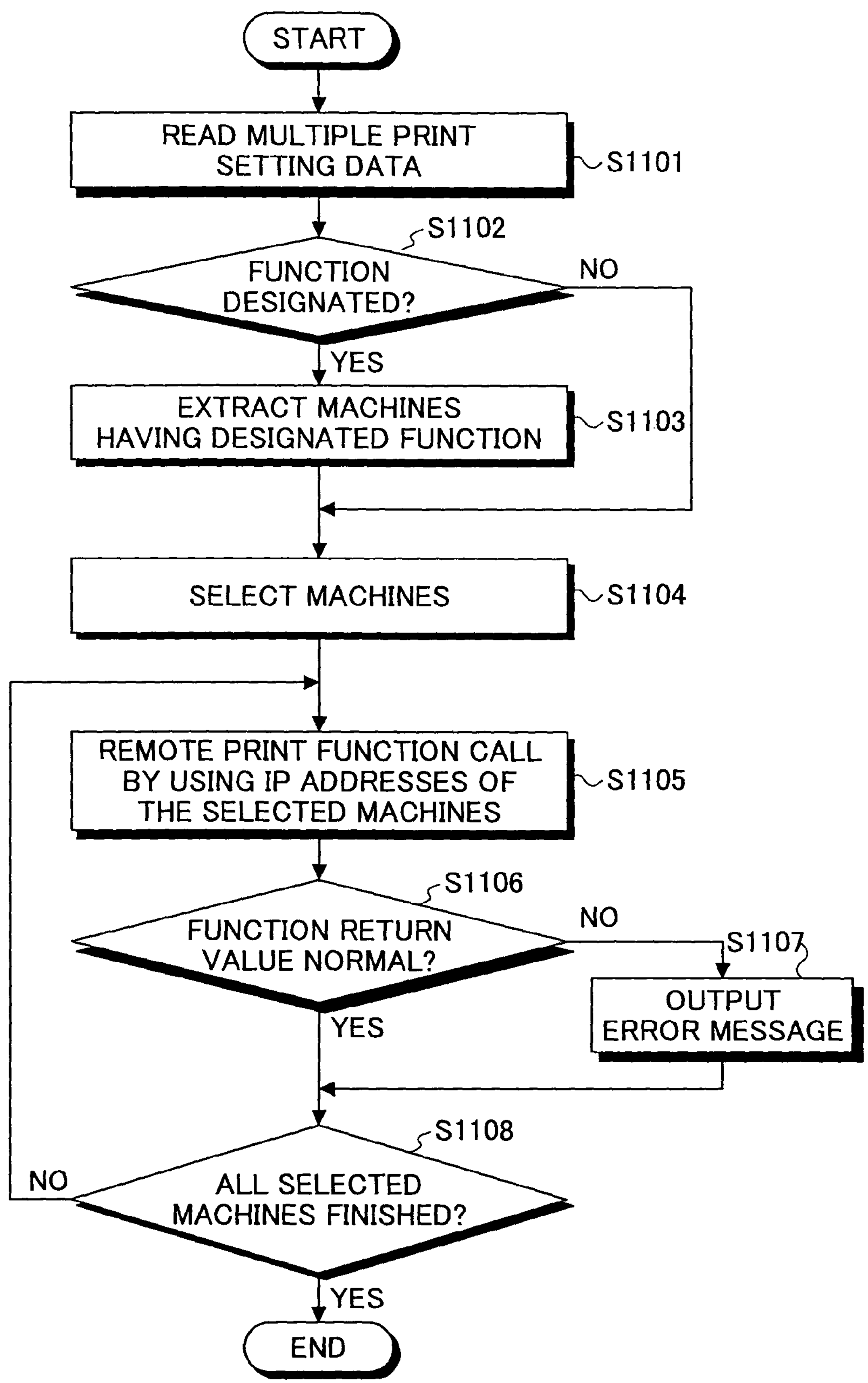
FIG. 12 is a flowchart for selecting compound machines and printers to be used for printing, and for distributing the print request.

Next, process for selecting compound machines and printers to be used for printing, and process for distributing the print request will be described. FIG. 11 shows data flows for the processes. FIG. 12 is a flowchart showing the procedure of the processes.

When the multiple print button is clicked on the multiple print screen 201 displayed on the Web browser of the PC 200, a request message is sent to the compound machine 100, in which the request message includes a print request, a specified file name, number of copies and functions. The compound machine 100 receives the request message by performing the same process as that shown in FIG. 10, and determines that the request message indicates a print request.

When the request message is determined to be the print request, the print request part 301 of the distribution application 117 reads multiple print setting data from the flash memory 310 in step S1101. Then, the print request part 301 determines whether any function is specified in the request message in step S1102.

When a function is specified in the request message, compound machines and/or printers that have the function are extracted from the multiple print setting data in step S1103. When any function is not specified in the request message, the above-mentioned process is not performed.

Next, the print request part 301 selects compound machines and printers, the number of which is the same as the number of copies specified in the request message, from the multiple print setting data 312 or compound machines or printers extracted in step S1103 in step S1104. Then, the print request part 301 performs remote print function call by specifying an IP address of a selected compound machines or printer in step S1105. According to performing the remote print function call, the print request message is sent to a printer application in the compound machine or the printer. Process of the remote printer function will be described later.

Next, the print request part 301 determines whether the return value of the remote printer function is normal or not in step S1106. If the return value is abnormal, an error message is sent to the PC 200 as a response message in step S1107. When the return value is normal, steps S1105-S1107 are repeated for every compound machine and printer selected in step S1104 in step S1108. Accordingly, the print request message is sent to each printer application in the specified compound machines and the printers.

Figure 13:
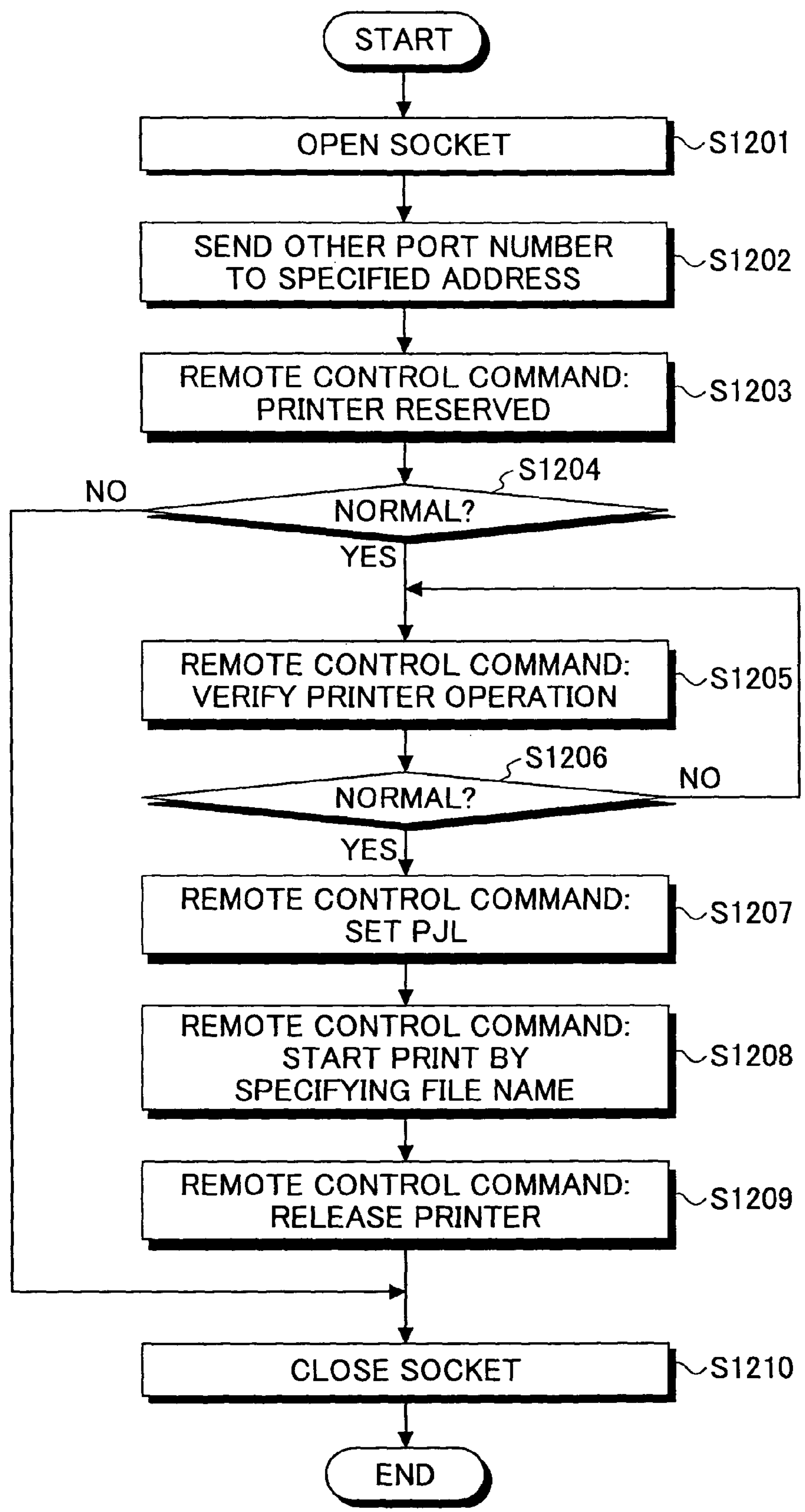
FIG. 13 shows a flowchart of the procedure of the print request message sending process executed by the remote print function.

Next, print request message sending process executed by the remote print function will be described. FIG. 13 shows a flowchart of the procedure of the print request message sending process executed by the remote print function.

First, the remote print function opens a socket in which the specified IP address and a predetermined rsh port number are combined in step S1201, in which the IP address is provided to the remote print function as an argument. Then, by using the rsh port, another port number is sent to a compound machine of the specified IP address in step S1202. After that, remote control commands by the rsh protocol can be sent.

Next, the remote print function issues a printer reservation command that is a remote control command in step S1203. If a normal response is returned, the remote print function issues a printer operation checking-command in steps S1204 and S1205. On the other hand, if an abnormal response is returned, the process returned to the distribution application 117 with an abnormal function return value.

The printer operation checking command is issued repeatedly until normal response is returned in step S1206. When the normal response is returned, PJL (Printer Job Language) is set according to print parameters based on input data in step S1207, and print start command is issued in step S1208. Accordingly, a print file 801 corresponding to the specified file name is sent to the compound machine or printer, and printing is started by the printer application of the compound machine or the printer.

When print process ends, a printer release command is issued in step S1209, and finally the socket is closed in step S1210, so that normal function return value is returned. According to the above-mentioned processes, the distribution application 117 performs remote print function call, so that a series of remote control commands are issued by the rsh protocol, and print process is performed in each of the selected compound machine and printers.

That is, as shown in FIG. 11, in the selected compound machine 140*a*, inetd 305 performs receiving monitor of rsh port. When receiving data, the rshd 308 is launched and received data is passed to the process of the NCS 128. The NCS 128 determines content of the received data. If the received data is the print request, the NCS 128 passes the print request to the printer application 111. The printer application analyzes the remote control command included in the received data and performs print processing.

In addition, according to the compound machine 100 of this embodiment, the compound machine 100 itself can print the print file according to the print request. Next, print request process in a case when the compound machine 100 itself is selected will be described.

When the compound machine (MFP0) 100 is set in the multiple print setting data 312 as a printer to which to send the print request, the print request part 301 of the distribution application 117 performs remote print function call by specifying a loop back address (IP address:127.0.0.0) in step S1105 in FIG. 12.

The loop back address is an IP address specified to prevent sending data from going out of the compound machine. The distribution application 117 performs remote print function call by specifying the loop back address to request for the printer application in the compound machine 100 itself to perform printing. The process of the print request part 301 in the distribution application 117 is the same as that shown in FIG. 12 except for specifying the loop back address when performing remote print function call.

Figure 14:
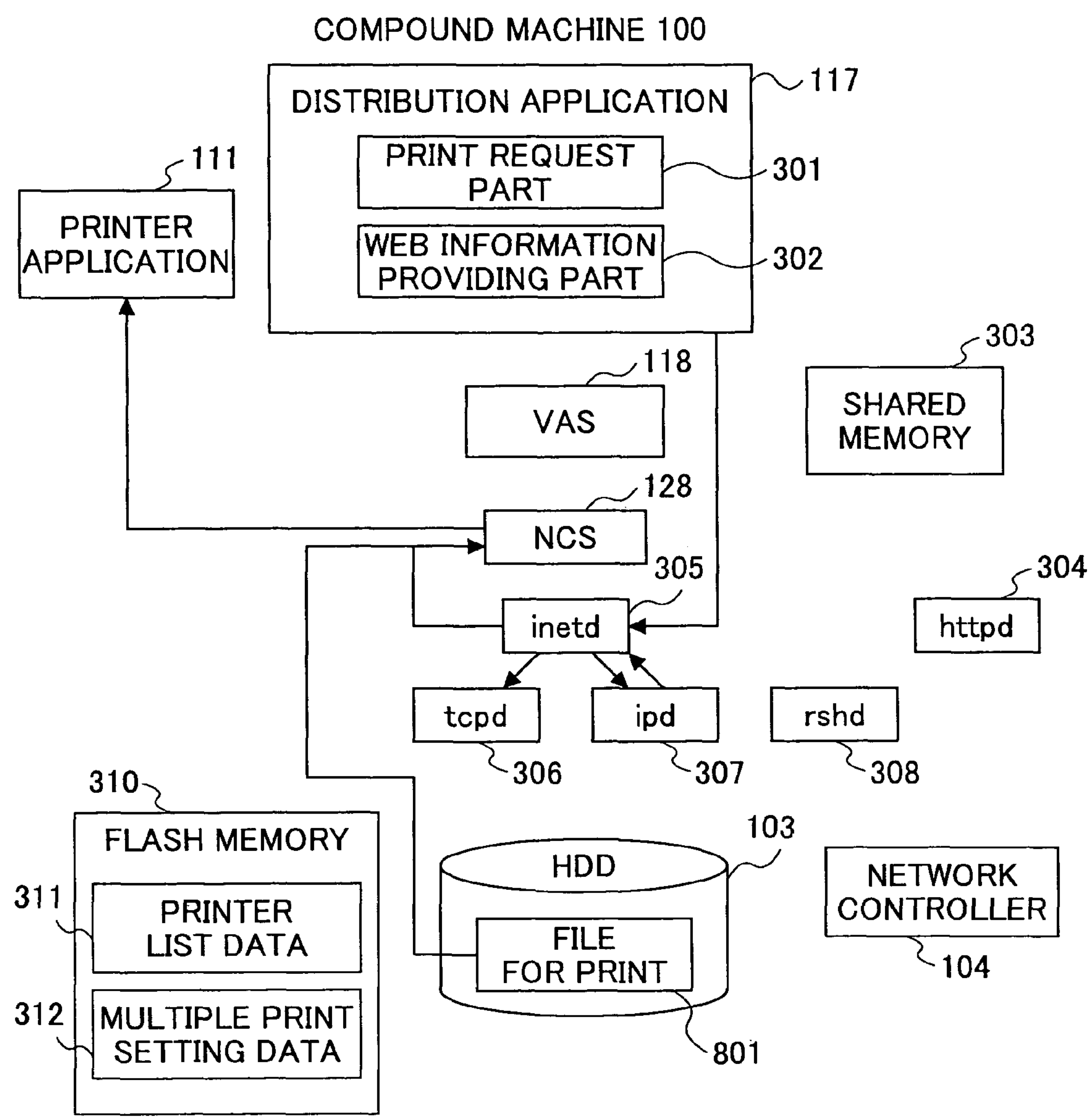
FIG. 14 shows relationship and data flow between the distribution application 117 and each daemon in the compound machine 100.

The operation of daemons in the general OS that processes the print request when the loop back address is specified will be described. FIG. 14 shows relationship and data flow between the distribution application 117 and each daemon in the compound machine 100.

As shown in FIG. 14, when the print request part 301 of the distribution application 117 performs the remote print function call, the inetd 305 receives the loop back address and the remote control command, and the tcpd 306 and the ipd 307 are launched, so that each daemon generates a packet. Then, as a result of address analysis, if the ipd 307 determines that the loop back address is specified, the ipd 307 sends information indicating that the loop back address is specified to the inetd 305. The inetd 305 sends data such as the remote control command, parameters, print file and the like to the process of NCS 128 without launching rshd 308. When the process of the NCS 128 receives the data from the inetd 305, the NCS 128 sends the data to the printer application 111. The printer application 111 analyzes the remote control command included in the received data, and executes printing process. By using the distribution application 117, the printing process can be performed in the compound machine itself without changing the configuration in which print request is sent to another compound machine on the network by using rsh protocol.

According to the compound machine 100 of the first embodiment, the print request part 301 receives a request from the PC 200, selects one or more compound machines or printers on the network, and distributes the print file and the print request. Thus, multiple printing can be performed without installing printer drivers in the PC 200 for the one or more compound machines or printers. Therefore, work load for constructing print environment for multiple printing can be eliminated.

In addition, according to the compound machine 100 of the first embodiment, since the print file can be printed by a plurality of printers, a plurality of number of copies can be made quickly.

In addition, according to the compound machine of the first embodiment, the print request part 301 can specify the loop back address. Thus, even though the compound machine 100 has an interface for requesting printers on the network to perform printing, the printer application in the compound machine 100 itself can perform printing by receiving the remote control command.

Second Embodiment

According to the compound machine 100 of the first embodiment, the compound machines 140*a* and the printers 140*b* are set in the multiple print setting data 312 beforehand, and apparatuses to which the print request is distributed are selected by using the multiple print setting data. On the other hand, according to the compound machine 100 of the second embodiment, the user selects the apparatuses at the time of performing print of a file.

The network configuration including the compound machine 100 of the second embodiment is the same as that of the first embodiment shown in FIG. 1. The configuration of the compound machine 100 of the second embodiment is the same as that of the compound machine 100 of the first embodiment. The distribution application 117 includes the print request part 301 and the Web information providing part 302.

According to the compound machine 100 of this embodiment, the selection process of the compound machines and the printers by the print request part 301 is different from that of the first embodiment. In addition, different from the first embodiment, the Web information providing part 302 causes the Web browser of the PC 200 to display a printer selection screen so that the user can select printers.

Figure 15:
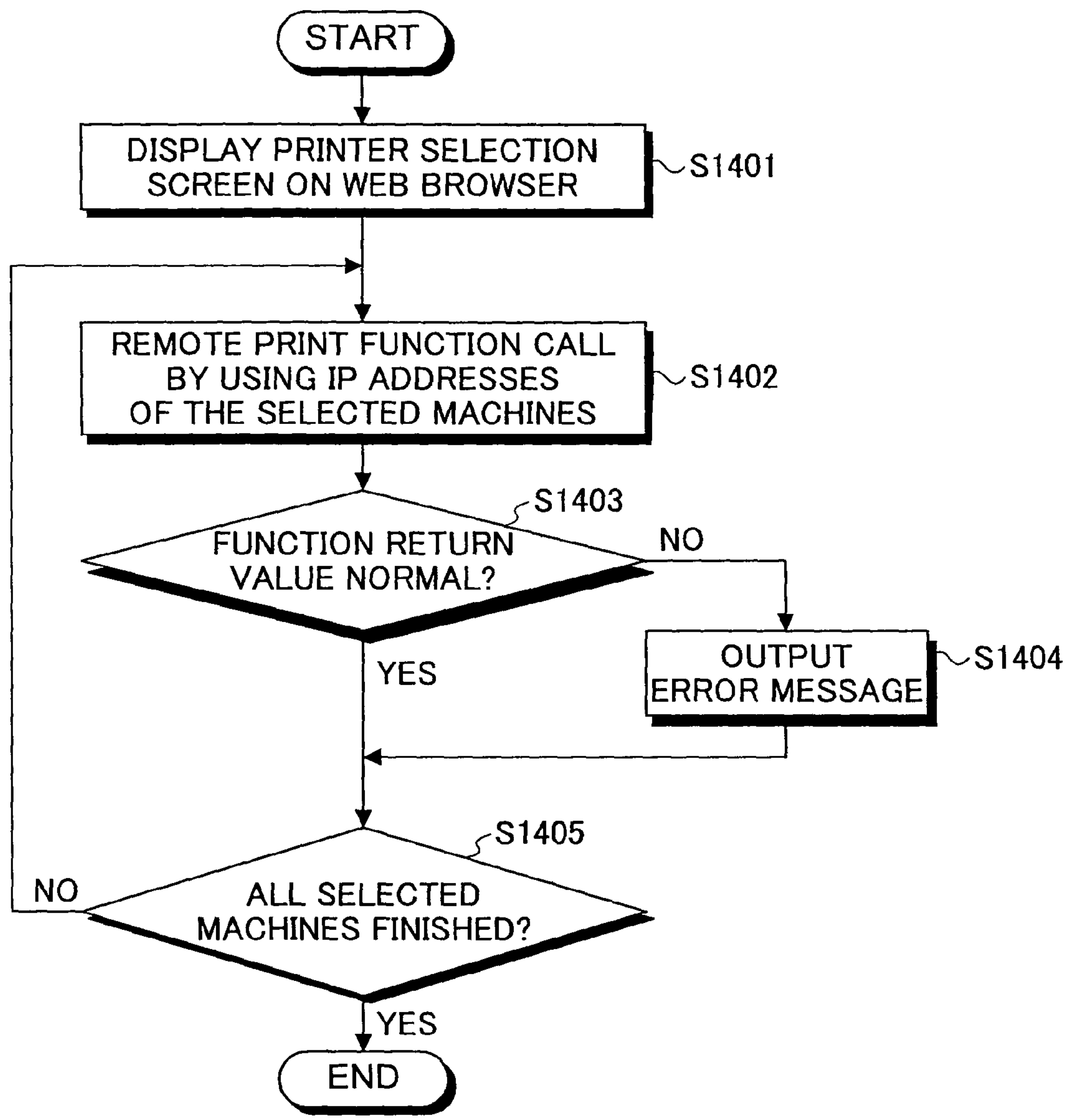
FIG. 15 is a flowchart showing a procedure of the process for selecting the compound machines and the printers performed by the distribution application 117 in the compound machine 100 according to the second embodiment.

FIG. 15 is a flowchart showing a procedure of the process for selecting the compound machines and the printers performed by the distribution application 117 in the compound machine 100 according to the second embodiment.

In the same way as the first embodiment, when the multiple print button is clicked from the multiple print screen 201 on the Web browser of the PC 200, the distribution application 117 receives a print request. Then, the Web information providing part 302 causes the Web browser in the PC 200 to display a printer selection screen 1501 in step S1401.

FIG. 16 shows an example of the printer selection screen displayed on the Web browser of the PC 200. Printer list data 311 stored in the flash memory 310 is read by the Web information providing part 302, and all of compound machines and printers set in the printer list data are displayed on the list box of the printer list in the printer selection screen 1501.

When the user selects one or a plurality of compound machines and printers on the printer selection screen 1501, and clicks the OK button, a request message is sent to the compound machine 100, in which the message body of the request message includes names of selected compound machines and printers, and, the file name, the number of copies and functions specified in the multiple print screen 201. The process in the compound machine 100 that receives the request message is the same as that of the compound machine 100 of the first embodiment.

Next, when the distribution application 117 receives the request message, the print request part 301 performs remote print function call by specifying an IP address of a compound machine or printer included in the request message in step S1402. By the remote print function call, a print request message is sent to a printer application of the compound machine or printer corresponding to the IP address. The process of the remote print function itself is the same as that of the compound machine of the first embodiment.

Next, the print request part 301 determines whether the return value of the remote print function call is normal or not in step S1403. When the return value is abnormal, the print request part 301 sends an error message as a response message to the PC 200 in step S1404. When the return value is normal, the steps S1402-S1404 are repeated for every compound machine and printer selected on the printer selection screen 1501 in step S1405. Accordingly, the print request message is sent to every compound machine and printer selected on the printer selection screen 1501.

As mentioned above, according to the compound machine 100 of the second embodiment, the Web information providing part 302 causes the PC 200 to display the printer selection screen 1501 on which the user can select compound machines and printers that can be used for printing on the network. In addition, the print request part 301 distributes the print file 801 and the print request to the compound machines and printers selected from the printer selection screen 1501. Therefore, even when the PC 200 does not include printer driver programs of the compound machines and the printers, the print file can be printed from desired compound machines and printers. Thus, it becomes unnecessary to construct printer environment in the PC 200 for the compound machines and the printers.

In addition, according to the compound machine 100 of the second embodiment, the printer request part 301 distributes the print request to the compound machines and the printers on the Ethernet 220. Thus, even if there are a plurality of copies to be printed, the copies can be printed simultaneously by the compound machines and the printers that the user wants. Therefore, the plurality of copies can be printed quickly.

Third Embodiment

According to the compound machine 100 of the first and second embodiment, the names and IP addresses of the compound machines and the printers are prepared as the printer list data beforehand, so that compound machines and printers to be used for printing are selected from the printer list data 311. On the other hand, according to the compound machine 100 of the third embodiment, the names and IP addresses are automatically obtained periodically, so that the printer list data 311 is produced.

Figure 17:
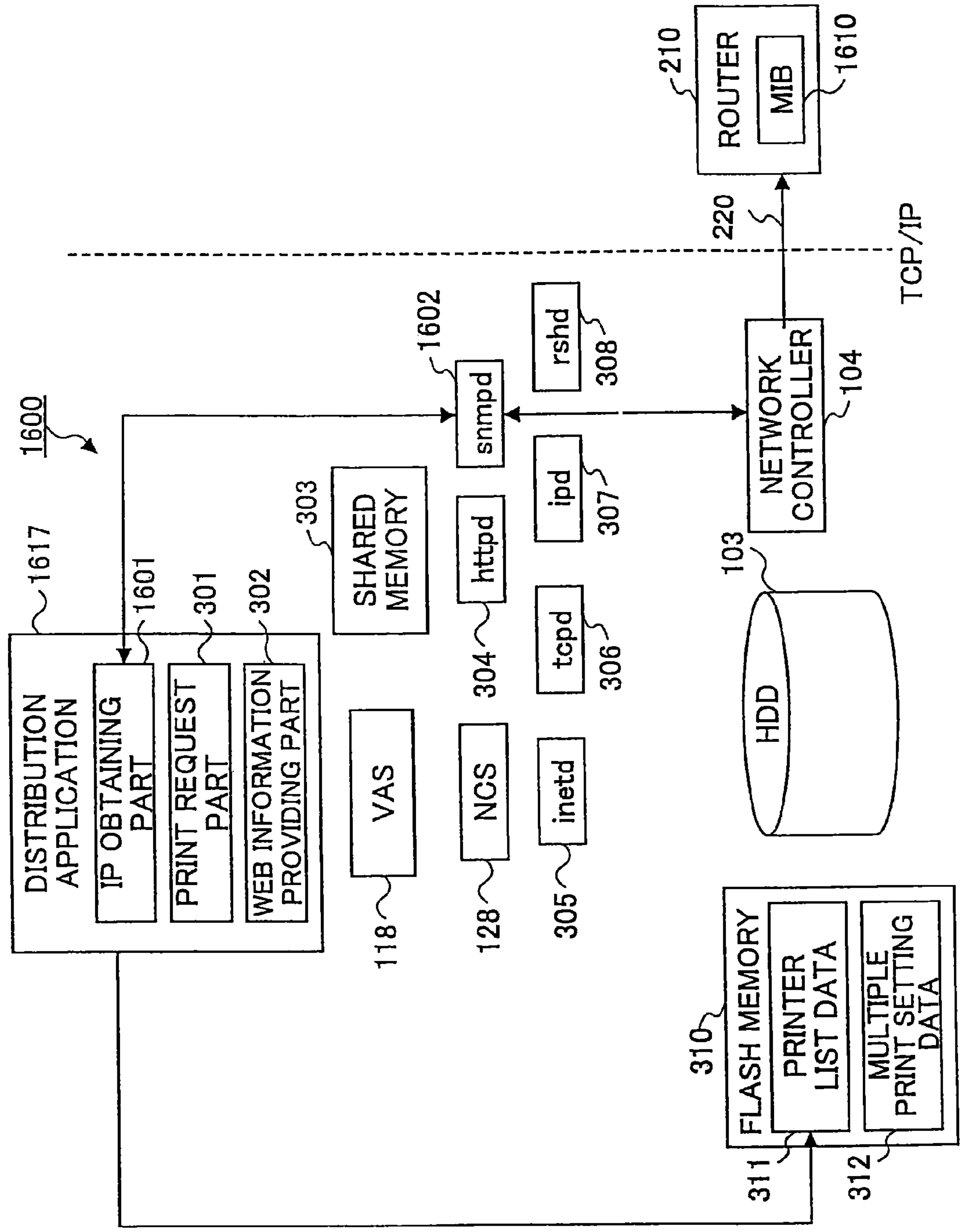
FIG. 17 is a block diagram showing the main configuration of the compound machine 1600 and data flow at the time of obtaining IP addressees according to the third embodiment.

FIG. 17 is a block diagram showing the main configuration of the compound machine 1600 and data flow at the time of obtaining IP addresses according to the third embodiment. The other functional configuration of the compound machine 1600 is the same as that of the compound machine of the first embodiment. In addition, the network configuration including the compound machine 1600 of the third embodiment is the same as that shown in FIG. 1.

As shown in FIG. 17, the distribution application 1617 in the compound machine 1600 includes an IP obtaining part 1601, the print request part 301 and the Web information providing part 302.

The IP obtaining part 1601 periodically accesses the MIB (management information base) 1610 stored in the router 210 on the Ethernet 220. Then, the IP obtaining part 1601 obtains IP addresses of the compound machines and printers on the Ethernet 220 from a data block relating to TCP/IP in the MIB. In addition, the IP obtaining part 1601 produces the printer list data 311 in which the obtained IP addresses are associated with names of apparatuses, and stores the printer list data 311 into the flash memory 310. The names can be obtained, for example, from the compound machines or the printers.

The snmpd 1602 is a daemon for accessing the router 210 according to the SNMP protocol when the IP obtaining part 1601 obtains IP addresses from the MIB 1610, in which the snmpd 1602 is launched by the inetd 305. The IP obtaining part 1601 obtains data from the MIB 1610 according to the SNMP protocol.

As mentioned above, according to the compound machine 1600 of the third embodiment, the IP obtaining part 1601 obtains the IP addresses of the compound machines and printers on the Ethernet 220. Then, the print request part 301 distributes the print request to each of the compound machines and printers by using the IP addresses. Therefore, even when the IP address is changed or a compound machine or a printer is added on the Ethernet 220, printing can be performed from the PC 200 that does not include the printer driver program.

According to the compound machine 1600 of the third embodiment, the printer list data is produced by obtaining the IP addresses from the MIB 1610. The compound machine 1600 can be also configured such that the IP obtaining part 1601 obtains an IP address each time when the compound machine 1600 receives a print request message by accessing the MIB.

The present invention is not limited to the specifically disclosed embodiments, and variations and modifications may be made without departing from the scope of the present invention.

What is claimed is:

1. An image forming apparatus comprising:

an information providing part configured to send, to a client terminal, screen data for inputting a print request;

a storage part configured to store information of functions of a plurality of image forming apparatuses, including the image forming apparatus and other image forming apparatuses connected to the image forming apparatus via a network, and information of destination addresses of the image forming apparatuses;

a printing part configured to perform print processing when receiving the print request and print data from the client terminal;

a determination part configured to determine whether a designation of a function is included in the print request, and when the designation of a function is included in the print request, to determine whether any of the plurality of image forming apparatuses, including the image forming apparatus, has the function included in the print request based on the information of functions stored in the storage part, and to extract any of the plurality of image forming apparatuses that have the function included in the print request; and a print request part configured to request the printing part of the image forming apparatus to print the print data when the designation of a function is included in the print request and when the image forming apparatus is included as an extracted image forming apparatus that has the function included in the print request based on the determination by the determination part, to request one or more of the other image forming apparatuses to print the print data when the designation of a function is included in the print request and when the one or more of the other image forming apparatuses are included as extracted image forming apparatus that have the function included in the print request based on the determination by the determination part, and to request the printing part of at least the image forming apparatus to print the print data when the designation of a function is not included in the print request.

2. The image forming apparatus as claimed in claim 1, wherein the screen data sent to the client terminal is used for selecting one or more image forming apparatuses from among the plurality of image forming apparatuses, wherein the information providing part sends the screen data for inputting a print instruction to the client terminal; and the print request part distributes the print data and the print request when receiving the print instruction from the client terminal.

3. The image forming apparatus as claimed in claim 2, wherein the screen data is used for uploading the print data to the client terminal; and the image forming apparatus receives the print data when the print data is uploaded from the client terminal.

4. The image forming apparatus as claimed in claim 2, wherein the screen data includes data for displaying a plurality of image forming apparatuses and corresponding places for each of the image forming apparatuses.

5. The image forming apparatus as claimed in claim 2, wherein the screen data includes data for displaying a plurality of image forming apparatuses and corresponding functions for each of the image forming apparatuses.

6. The image forming apparatus as claimed in claim 1, wherein the print request part distributes the print data and the print request by referring to the information stored in the storage part.

7. The image forming apparatus as claimed in claim 1, wherein the print request part requests the printing part of the image forming apparatus itself to print the print data by using a loop back address.

8. The image forming apparatus as claimed in claim 1, wherein the print request part comprises an address obtaining part for obtaining addresses of the other image forming apparatuses connected to a network; and wherein the print request part distributes the print data and the print request by using the addresses obtained by the address obtaining part.

9. The image forming apparatus as claimed in claim 1, wherein the image forming apparatus is configured to be able to install a plurality of applications separately from at least one control service, and the image forming apparatus includes the print request part as an application.

10. The image forming apparatus as claimed in claim 1, wherein when an address of the image forming apparatus is stored in the storage part due to selection of the image forming apparatus at the client terminal and when the image forming apparatus includes the function included in the print request, the print request part requests a printing part of the image forming apparatus to print the print data by specifying a loop back address for returning the print data back within the image forming apparatus.

11. The image forming apparatus as claimed in claim 1, wherein when an error is output when the print request part either requests the printing part of the image forming apparatus to print the print data, or requests one or more of the other image forming apparatuses to print the print data, another image forming apparatus of the plurality of image forming apparatuses is selected and the print request part requests the another image forming apparatus to print the print data.

12. The image forming apparatus as claimed in claim 1, further comprising:

an address obtaining part for obtaining addresses of the other image forming apparatuses automatically and periodically to generate printer list data to be stored in the storage part, the printer list data associating names of the other image forming apparatuses with the respective obtained addresses of the other image forming apparatuses.

13. A print process method used in an image forming apparatus, the print process method comprising:

sending, from an information providing part, screen data to a client terminal for inputting a print request;

storing, at a storage part of the image forming apparatus, information of functions of a plurality of image forming apparatuses, including the image forming apparatus and other image forming apparatuses connected to the image forming apparatus via a network, and information of destination addresses of the image forming apparatuses;

performing, at a printing part of the image forming apparatus, print processing when receiving the print request and print data from the client terminal;

determining whether a designation of a function is included in the print request, and when the designation of a function is included in the print request, determining whether any of the plurality of image forming apparatuses, including the image forming apparatus, has the function included in the print request based on the information of functions stored in the storage part, and extracting any of the plurality of image forming apparatuses that have the function included in the print request; and requesting the printing part of the image forming apparatus to print the print data when the designation of a function is included in the print request and when the image forming apparatus is included as an extracted image forming apparatus that has the function included in the print request based on the determining step, requesting one or more of the other image forming apparatuses to print the print data when the designation of a function is included in the print request and when the one or more of the other image forming apparatuses are included as extracted image forming apparatus that have the function included in the print request based on the determining step, and requesting the printing part of at least the image forming apparatus to print the print data when the designation of a function is not included in the print request.

14. The print process method as claimed in claim 13, wherein the screen data sent to the client terminal, is used for selecting one or more image forming apparatuses from among the plurality of image forming apparatuses, wherein the image forming apparatus sends the screen data for inputting a print instruction to the client terminal, and distributes the print data and the print request in response to the print instruction from the client terminal.

15. The print process method as claimed in claim 14, wherein the image forming apparatus sends the screen data used for uploading the print data to the client terminal, and receives the print data when the print data is uploaded from the client terminal.

16. The print process method as claimed in claim 14, wherein the screen data includes data for displaying the plurality of image forming apparatuses and locations thereof.

17. The print process method as claimed in claim 14, wherein the screen data includes data for displaying the plurality of image forming apparatuses and functions thereof.

18. The print process method as claimed in claim 13, wherein the image forming apparatus distributes the print data and the print request by referring to the stored information of destination addresses.

19. The print process method as claimed in claim 14, wherein the print instruction includes an instruction for designating functions to be used for printing the print data.

20. The print process method as claimed in claim 13, wherein the image forming apparatus requests the printing part of the image forming apparatus itself to print the print data by using a loop back address.

21. The print process method as claimed in claim 13, wherein the image forming apparatus is configured to be able to install a plurality of applications separately from at least one control service, and each application performs providing and distributing.

22. The print process method as claimed in claim 13, further comprising:

requesting the printing part of the image forming apparatus to print the print data by specifying a loop back address for returning the print data back within the image forming apparatus when an address of the image forming apparatus is stored in the storage unit due to selection of the image forming apparatus at the client terminal and when the image forming apparatus includes the function included in the print request.

23. A computer readable medium storing computer code that when executed on an image forming apparatus causes the image forming apparatus to perform a method comprising:

sending, from an information providing part, screen data to a client terminal for inputting a print request;

storing, at a storage part of the image forming apparatus, information of functions of a plurality of image forming apparatuses, including the image forming apparatus and other image forming apparatuses connected to the image forming apparatus via a network, and information of destination addresses of the image forming apparatuses;

performing, at a printing part of the image forming apparatus, print processing when receiving the print request and print data from the client terminal;

determining whether a designation of a function is included in the print request, and when the designation of a function is included in the print request, determining whether any of the plurality of image forming apparatuses, including the image forming apparatus, has the function included in the print request based on the information of functions stored in the storage part, and extracting any of the plurality of image forming apparatuses that have the function included in the print request; and requesting the printing part of the image forming apparatus to print the print data when the designation of a function is included in the print request and when the image forming apparatus is included as an extracted image forming apparatus that has the function included in the print request based on the determining step, requesting one or more of the other image forming apparatuses to print the print data when the designation of a function is included in the print request and when the one or more of the other image forming apparatuses are included as extracted image forming apparatus that have the function included in the print request based on the determining step, and requesting the printing part of at least the image forming apparatus to print the print data when the designation of a function is not included in the print request.

24. The computer readable medium according to claim 23, further comprising:

requesting the printing part of the image forming apparatus to print the print data by specifying a loop back address for returning the print data back within the image forming apparatus when an address of the image forming apparatus is stored in the storage unit due to selection of the image forming apparatus at the client terminal and when the image forming apparatus includes the function included in the print request.

* * * * *